(12) United States Patent
Yang et al.

(10) Patent No.: US 12,222,422 B2
(45) Date of Patent: Feb. 11, 2025

(54) POST-PROCESSING OF MAPPING DATA FOR IMPROVED ACCURACY AND NOISE-REDUCTION

(71) Applicant: DJI Research LLC, Palo Alto, CA (US)

(72) Inventors: Zhenyu Yang, Palo Alto, CA (US); Zhenghe Shangguan, Palo Alto, CA (US); Arjun Sukumar Menon, San Jose, CA (US); Weifeng Liu, Fremont, CA (US)

(73) Assignee: DJI RESEARCH LLC, Cerritos, CA (US)

( * ) Notice: Subject to any disclaimer, the term of this patent is extended or adjusted under 35 U.S.C. 154(b) by 44 days.

(21) Appl. No.: 17/997,997

(22) PCT Filed: Jun. 22, 2021

(86) PCT No.: PCT/US2021/038461
§ 371 (c)(1),
(2) Date: Nov. 4, 2022

(87) PCT Pub. No.: WO2021/262704
PCT Pub. Date: Dec. 30, 2021

(65) Prior Publication Data
US 2023/0177707 A1 Jun. 8, 2023

Related U.S. Application Data

(60) Provisional application No. 63/044,965, filed on Jun. 26, 2020.

(51) Int. Cl.
*G01S 17/89* (2020.01)
*G01S 7/48* (2006.01)
(Continued)

(52) U.S. Cl.
CPC .......... *G01S 17/89* (2013.01); *G01S 7/4808* (2013.01); *G01S 17/42* (2013.01); *G01S 17/86* (2020.01);
(Continued)

(58) Field of Classification Search
None
See application file for complete search history.

(56) References Cited

U.S. PATENT DOCUMENTS

2019/0301873 A1  10/2019  Prasser et al.
2019/0346271 A1  11/2019  Zhang et al.

OTHER PUBLICATIONS

International Search Report and Written Opinion for International Application No. PCT/US2021/038461, dated Sep. 24, 2021, 9 pages.

*Primary Examiner* — Jwalant Amin
(74) *Attorney, Agent, or Firm* — ANOVA LAW GROUP, PLLC

(57) ABSTRACT

Techniques are disclosed for post-processing mapping data in a movable object environment. A method for post-processing mapping data can include obtaining a plurality of scans, each scan comprising georeferenced mapping data and corresponding payload pose data obtained from a payload supported by an unmanned aerial vehicle (UAV), generating a plurality of local maps based on matching portions of the plurality of scans using the georeferenced mapping data, generating a pose graph based on identifying a plurality of correspondence points among the plurality of local maps, and optimizing the pose graph by minimizing an error distance between each pair of correspondence points to obtain optimized transforms for two scans among the plurality of the scans.

20 Claims, 11 Drawing Sheets

(51) Int. Cl.
   *G01S 17/42*      (2006.01)
   *G01S 17/86*      (2020.01)
   *G01S 17/88*      (2006.01)
   *G06T 7/33*       (2017.01)
   *G06T 11/00*      (2006.01)
(52) U.S. Cl.
   CPC .............. *G01S 17/88* (2013.01); *G06T 7/337* (2017.01); *G06T 11/001* (2013.01); *G06T 2207/10028* (2013.01)

POST-PROCESSING OF MAPPING DATA FOR IMPROVED ACCURACY AND NOISE-REDUCTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This application is a continuation application of International Application PCT/US2021/038461, filed Jun. 22, 2021, entitled, "POST-PROCESSING OF MAPPING DATA FOR IMPROVED ACCURACY AND NOISE-REDUCTION," which claims priority from U.S. Provisional Application No. 63/044,965, filed Jun. 26, 2020, which is hereby incorporated by reference.

FIELD OF THE INVENTION

The disclosed embodiments relate generally to techniques for post-processing mapping data and more particularly, but not exclusively, to techniques for post-processing of LiDAR 3D point cloud data for improved accuracy and noise reduction.

BACKGROUND

Movable objects such as unmanned aerial vehicles (UAVs) can be used for performing surveillance, reconnaissance, and exploration tasks for various applications. Movable objects may carry a payload, including various sensors, which enables the movable object to capture sensor data during movement of the movable objects. The captured sensor data may be rendered on a client device, such as a client device in communication with the movable object via a remote control, remote server, or other computing device.

SUMMARY

Techniques are disclosed for post-processing mapping data in a movable object environment. A method for post-processing mapping data can include obtaining a plurality of scans, each scan comprising georeferenced mapping data and corresponding payload pose data obtained from a payload supported by an unmanned aerial vehicle (UAV), generating a plurality of local maps based on matching portions of the plurality of scans using the georeferenced mapping data, generating a pose graph based on identifying a plurality of correspondence points among the plurality of local maps, and optimizing the pose graph by minimizing an error distance between each pair of correspondence points to obtain optimized transforms for two scans among the plurality of the scans.

DETAILED DESCRIPTION

Figure 1:
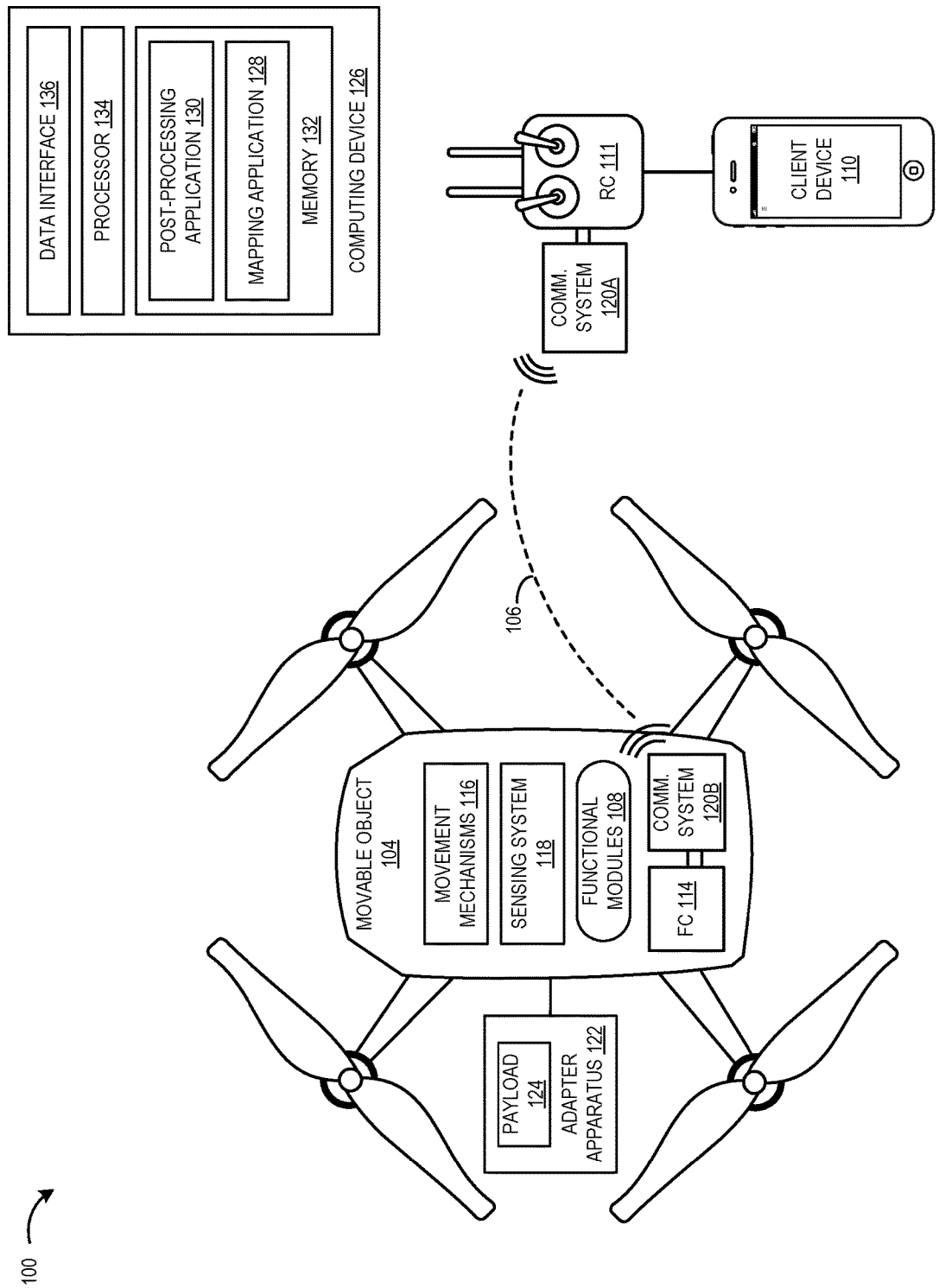
FIG. 1 illustrates an example of a movable object in a movable object environment, in accordance with various embodiments.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes target mapping using a movable object. For simplicity of explanation, an unmanned aerial vehicle (UAV), also referred to herein as a "drone" or "unmanned aircraft," is generally used as an example of a movable object. It will be apparent to those skilled in the art that other types of movable objects, such as a manned or unmanned aerial vehicle (e.g., a fixed-wing aircraft, a rotary-wing aircraft, or an aircraft having neither fixed wings nor rotary wings), a manned or unmanned ground vehicle (e.g., a motor vehicle, such as a car, truck, bus, van, motorcycle, bicycle), or a manned or unmanned water vehicles (e.g., a ship or a submarine), can be used without limitation.

Mapping data or scanning data, such as point cloud data or LiDAR data obtained from LiDAR sensors, is not ready for human review without significant post-processing. This post-processing is often time consuming and computationally expensive, which can result in significant delays to a mapping project. For example, conventional systems can require potentially weeks of post-processing time to turn raw mapping data into a human readable form. This can lead to significant delays between mapping missions to determine what areas are left to map, what areas need to be scanned again, etc. based on the post-processed mapping data. In conventional systems, post-processing is complex. Raw mapping data, position data, etc. is analyzed and features are extracted from the raw data. These features can then be used to combine the mapping data into useful forms during post processing. Feature extraction is time consuming, computationally expensive, and introduces its own errors into the data. Further, more calculations are required to convert back from the feature space into the data space once the features have been used to combine the mapping data, leading to potentially more errors, and requiring more computational resources and processing time.

Embodiments perform post-processing on the data itself, without relying on features that must be extracted from the underlying data. This improves processing time and results in more accurate mapping data that has not had errors introduced through the feature extraction process. As discussed further below, mapping data may be obtained from a payload coupled to a UAV. The payload may include a plurality of sensors in a single housing which can be mounted to the UAV through a single port which provides power, data communications, and structural support for the payload. The sensor data recorded by the payload can be stored to a removable storage medium incorporated into the payload or the UAV that is in communication with the payload. When a mapping mission is completed, the removable storage medium can be removed from the payload or the UAV and provided to a computing device that includes a post-processing application or a mapping application. The post-processing application can perform post-processing on the data collected by the payload to generate post-processed mapping data which can be visualized by the post-processing application or the mapping application.

FIG. 1 illustrates an example of a movable object in a movable object environment 100, in accordance with various embodiments. As shown in FIG. 1, client device 110 in a movable object environment 100 can communicate with a movable object 104 via a communication link 106. The movable object 104 can be an unmanned aircraft, an unmanned vehicle (e.g., a motor vehicle, such as a car, truck, bus, van, motorcycle, bicycle, etc.), a handheld device, and/or a robot. The client device 110 can be a portable personal computing device, a smart phone, a remote control, a wearable computer, a virtual reality/augmented reality system, and/or a personal computer. Additionally, the client device 110 can include a remote controller 111 and communication system 120A, which is responsible for handling the communication between the client device 110 and the movable object 104 via communication system 120B. For example, the communication between the client device 110 and the movable object 104 (e.g., an unmanned aircraft) can include uplink and downlink communication. The uplink communication can be used for transmitting control signals or commands, the downlink communication can be used for transmitting media or video stream, mapping data collected by scanning sensors, or other sensor data collected by other sensors.

In accordance with various embodiments, the communication link 106 can be (part of) a network, which is based on various wireless technologies, such as the WiFi, Bluetooth, 3G/4G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can include an adapter apparatus 122 and a payload 124, such as a scanning sensor (e.g., a LiDAR sensor), camera(s), and/or a collection of sensors in a single payload unit. In various embodiments, the adapter apparatus 122 includes a port for coupling the payload 124 to the movable object 104 which provides power, data communications, and structural support for the payload 124. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV, a ground vehicle, a robot, a handheld device, etc.). In some instances, the payload 124 may be provided on the movable object 104 without requiring the adapter apparatus 122.

In accordance with various embodiments, the movable object 104 may include one or more movement mechanisms 116 (e.g., propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms 116 may all be of the same type. Alternatively, the movement mechanisms 116 can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by an application executing on client device 110 or other computing device in communication with the movement mechanisms. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally oriented rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110, the remote controller 111, or other entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, real-time kinematic (RTK) sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120B enables communication with client device 110 via communication link 106, which may include various wired and/or wireless technologies as discussed above, and communication system 120A. The communication system 120A or 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120B of the movable object 104 to one or more receivers of the communication system 120A of the client device 110, or vice-versa. Alternatively, the communication may be two-way communication, such that data can be transmitted in both directions between the movable object 104 and the client device 110. The two-way communication can involve transmitting data from one or more transmitters of the communication system 120B of the movable object 104 to one or more receivers of the communication system 120A of the client device 110, and transmitting data from one or more transmitters of the communication system 120A of the client device 110 to one or more receivers of the communication system 120B of the movable object 104.

In some embodiments, an application executing on client device 110 or other computing devices that are in communication with the movable object 104 can provide control data to one or more of the movable object 104, adapter apparatus 122, and payload 124 and receive information from one or more of the movable object 104, adapter apparatus 122, and payload 124 (e.g., position and/or motion information of the movable object, adapter apparatus or payload; data sensed by the payload such as image data captured by one or more payload cameras or mapping data captured by a payload LiDAR sensor; and data generated from image data captured by the payload camera or LiDAR data generated from mapping data captured by the payload LiDAR sensor).

In some embodiments, the control data may result in a modification of the location and/or orientation of the movable object 104 (e.g., via control of the movement mechanisms 116), or a movement of the payload 124 with respect to the movable object 104 (e.g., via control of the adapter apparatus 122). The control data from the application may result in control of the payload 124, such as control of the operation of a scanning sensor, a camera or other image capturing device (e.g., scanning a target object or a target environment, taking still or moving pictures, zooming in or out, turning on or off, switching imaging modes, changing image resolution, changing focus, changing depth of field, changing exposure time, changing viewing angle or field of view, adding or removing waypoints, etc.).

In some instances, the communications from the movable object 104, adapter apparatus 122 and/or payload 124 may include information obtained from one or more sensors (e.g., of the sensing system 118 or of the scanning sensor or other payload) and/or data generated based on the sensing information. The communications may include sensed information obtained from one or more different types of sensors (e.g., GPS sensors, RTK sensors, motion sensors, inertial sensors, proximity sensors, LiDAR sensors, or image sensors). Such information may pertain to the position (e.g., location, altitude, orientation, attitude), movement, or acceleration of the movable object, adapter apparatus, and/or payload. Such information from a payload may include data captured by the payload or a sensed state (e.g., payload modes, orientation or attitude of the payload, etc.) of the payload.

In some embodiments, the movable object 104 and/or payload 124 can include one or more processors, such as CPUs, GPUs, field programmable gate arrays (FPGAs), system on chip (SoC), application-specific integrated circuit (ASIC), or other processors and/or accelerators. As discussed, the payload 124 may include various sensors integrated into a single payload, such as a LiDAR sensor, one or more cameras, an inertial navigation system, etc. The payload can collect sensor data that is used to provide LiDAR-based mapping for various applications, such as construction, surveying, target inspection, etc. In some embodiments, lower resolution maps can be generated in real-time and higher resolution maps can be generated by post-processing the sensor data collected by the payload 124.

In various embodiments, once a mapping mission is complete, sensor data may be obtained from the payload 124 and provided to computing device 126 for post-processing. For example, the payload 124 or the movable object 104 that is in communication with the payload 124 via the adapter apparatus 122 may include removable media, such as a secure digital (SD) card or other removable media such as flash memory-based memory devices. The removable media can store sensor data of a mapping mission obtained from the payload 124. In some embodiments, the computing device 126 can be disposed off board the movable object 104, such as at a ground terminal, the remote control 111, the client device 110, or other remote terminals. In such embodiments, the computing device 126 can include a data interface 136, such as a card reader, which can read the sensor data stored on the removable media. In other embodiments, the computing device 126 can be disposed onboard the movable object 104, such as at the payload 124 or within the movable object 104. In such embodiments, the computing device 126 can include a data interface 136, which can read the sensor data from an onboard memory of the payload 124 or the movable object 104, or from the removable media through an onboard card reader. In some embodiments, the computing device 126 can operate on the data stored on the removable media directly or store a local copy, such as in memory 132, on disk (not shown) or other storage location accessible to the computing device 126, such as an attached storage device, network storage location, etc. The computing device 126 can include one or more processors 134, such as CPUs, GPUs, field programmable gate arrays (FPGAs), system on chip (SoC), application-specific integrated circuit (ASIC), or other processors and/or accelerators. As shown, memory 132 can include a mapping application 128 to show visualizations of the post-processed scanning data/mapping data generated by a post-processing application 130.

As discussed, the sensor data can include scanning data/ mapping data obtained from a LiDAR sensor or other sensor that provides high resolution scanning of a target environment, pose data indicating the attitude of the payload when the scanning data was obtained (e.g., from an inertial measurement unit (IMU)), and positioning data from a positioning sensor (e.g., a GPS module, RTK module, or other positioning sensor), where the sensors providing the sensor data are all incorporated into a single payload 124. In some embodiments, various sensors incorporated into the single payload 124 can be pre-calibrated based on extrinsic and intrinsic parameters of the sensors and synchronized based on a reference clock signal shared among the various sensors. The reference clock signal may be generated by time circuitry associated with one of the various sensors or a separate time circuitry connecting the various sensors. In some embodiments, the positioning data from the positioning sensor of the payload 124 may be updated based on correction data received from a positioning sensor of the movable object 104 which may be included in functional modules 108, sensing system 118, or a separate module coupled to movable object 104 providing positioning data for the movable object 104. The scanning data/mapping data can be geo-referenced using the positioning data and used to construct the map of the target environment.

The geo-referenced scanning data/geo-referenced mapping data and the payload pose data can be provided to the post-processing application 130 for post-processing into a human readable form, as discussed further below. In some embodiments, the post-processing application 130 can output an optimized map (e.g., "optimized point cloud") as a LiDAR Data Exchange File (LAS) which may be used by various tools, such as mapping application 128, to render the map of the target environment and/or use the mapping data for further processing, planning, etc. Metadata embedded in the LAS output file can facilitate integration of the map with various third-party tools. In various embodiments, the map may be output in various file formats depending on user preferences.

Figure 2:
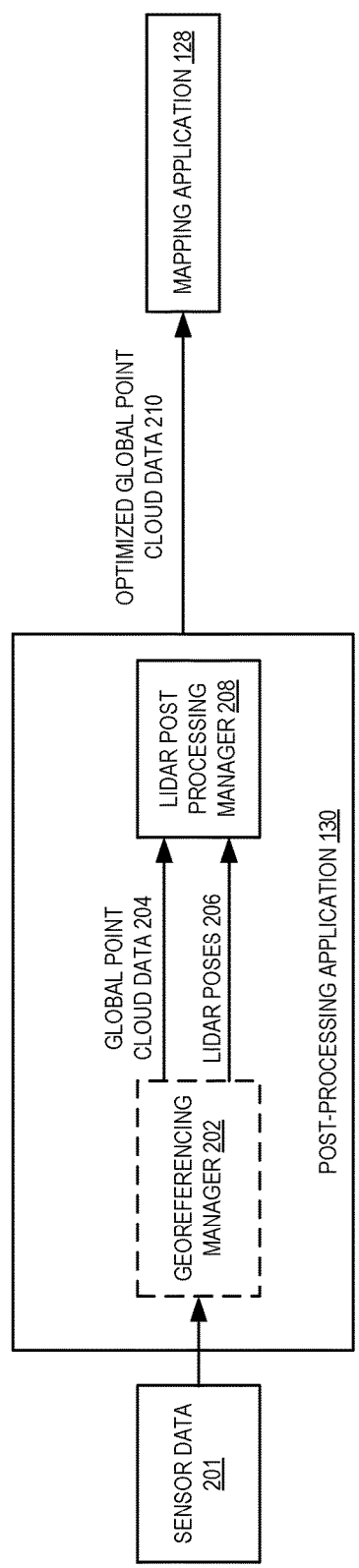
FIG. 2 illustrates an example of a data flow for performing post-processing of mapping data, in accordance with various embodiments.

FIG. 2 illustrates an example 200 of data flow for performing post-processing of mapping data, in accordance with various embodiments. As discussed, the sensor data 201 can include scanning data/mapping data (e.g., from a LiDAR sensor) and position data (e.g., from a GPS module, RTK module, or other positioning sensor). This can be used to create geo-referenced scanning/mapping data (e.g., global point cloud data 204). In various embodiments, geo-referencing of the scanning/mapping data may be performed on the payload and written to the removable media along with the payload pose data (e.g., from an inertial measurement unit (IMU)) and various other sensor data from sensors in the payload 124. For example, location information associated with the payload (e.g., from a GPS or other global positioning system sensor) can be used to associate geographic coordinates with the scanning data/mapping data using various geo-referencing techniques. Alternatively, in some embodiments, georeferencing manager 202 may perform georeferencing on raw point cloud data and position data received from sensors incorporated into payload 124 (which may be included in sensor data 201). As shown, georeferencing manager 202 may be optionally implemented as part of post-processing application 130. Alternatively, georeferencing manager 202 may be implemented as a standalone application running on, e.g., a computing device coupled to movable object 104 or payload 124, or on computing device 126.

As shown in FIG. 2, georeferenced data including the geo-referenced scanning/mapping data 204 and the payload pose data 206 can be provided to a post-processing application 130 to perform LiDAR post-processing. In some embodiments, the georeferenced data is stored on removable media of the payload and transferred to a computing device that includes post-processing application 130 following a scanning mission. The output of the LiDAR post processing can include optimized global point cloud data 210 which is a dense point cloud map of the target environment that was scanned by the movable object using the attached payload.

The georeferenced data may include global point cloud data 204 and LiDAR poses 206. The global point cloud data 204 includes scanning data captured by a LiDAR sensor that has been georeferenced to a global frame. The LiDAR poses 206 include pose data for the LiDAR sensor or payload 124 as the LiDAR sensor captured the point cloud data. The pose data may be obtained from an inertial measurement unit (IMU) included in the same payload 124 as the LiDAR sensor or otherwise coupled to the LiDAR sensor. This data is then provided to LiDAR post processing manager 208 to perform post processing on the data. In various embodiments, post-processing can include cleaning up the data to reduce noise and outliers from the data. Additionally, color data obtained from an RGB camera included in payload 124 can be overlaid on the optimized global point cloud data 210 to provide a more realistic appearance to the point cloud data. In some embodiments, the optimized global point cloud data 210 is generated by matching scans of the input point cloud data and removing noise from the scans.

Figure 3:
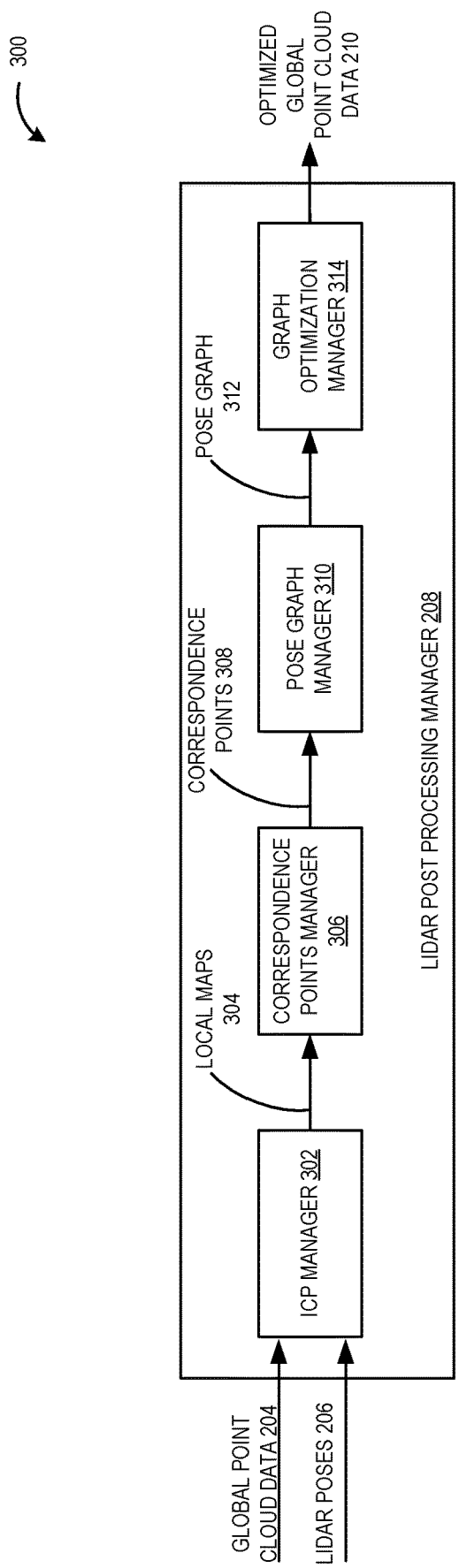
FIG. 3 illustrates an example of a data flow for performing post-processing of mapping data, in accordance with various embodiments.

FIG. 3 illustrates an example 300 of data flow for performing post-processing of mapping data (e.g., point cloud data), in accordance with various embodiments. As shown in FIG. 3, post-processing may include receiving the global point cloud data 204 (e.g., geo-referenced point cloud data) and the payload pose data 206 by an iterative closest matching (ICP) manager 302 to create local maps. For example, iterative closest point matching is a technique that can be used to combine multiple scans of a target region. For example, scans of a target region captured from different positions and/or angles may result in some portion(s) of the target region being scanned more than once. As such, points within multiple scans represent the same real point in the space of the target region. ICP matching enables the post-processing system to combine these overlapping scans into a single local map. In some embodiments, the ICP matching algorithm comprises a point-to-plane ICP algorithm.

The local maps 304 are then provided to correspondence points manager 306. Correspondence points manager 306 can analyze the local maps 304 to identify correspondence points 308. A correspondence point is a point in space that has been scanned multiple times from multiple poses. As a result, these points appear in multiple scans and/or multiple local maps. The correspondence points 308 can be used to construct a pose graph 312. In some embodiments, the correspondence points manager 306 implements the same, or different, ICP algorithm as the ICP manager 302 to determine the correspondence points 308. Alternatively, in some embodiments, the ICP manager 302 is responsible for both generating the local maps 304 and then identifying correspondence points 308 from the local maps.

The correspondence points manager 306 can identify the correspondence points 308 in the point cloud data directly, rather than relying on feature points. Each correspondence point exists in multiple local maps. This may be referred to as a pair of correspondence points, where the pair of correspondence points each represent the same point in space. Prior point cloud matching techniques compute feature points (for example the point feature histograms (PFH), fast point feature histograms (FPFH), 3D scale invariant feature transform (SIFT) feature point or other feature extraction techniques) and then estimate correspondence points from these feature points. Instead, embodiments use ICP to directly determine correspondence from the point cloud data without computing human crafted features (e.g., PFH, FPFH, 3D SIFT, etc.). This avoids potential error that is introduced during the process of abstracting feature information. This additionally can be performed more quickly and with fewer processing resources as no feature extraction is required.

The correspondence points 308 are then provided to pose graph manager 310. Pose graph manager 310 uses the pose data 206 and the correspondence points 308 to construct a pose graph 312. The pose graph 312 is then provided to graph optimization manager 314. Graph optimization techniques can be used to optimize the pose graph 312 to create the optimized point cloud data 210. As discussed further below, the graph optimization manager 314 can determine transforms for each pair of correspondence points by solving a system of error functions. The transforms result in a minimization of the distance between the pair of correspondence points in the global frame. As each pair of correspondence points represent the same point in the real world, the distance between these points is ideally zero, however noise and other interference can result in an error distance. By minimizing this distance, an optimized pose graph is created which can be used to generate optimized global point cloud data 210.

Figure 4:
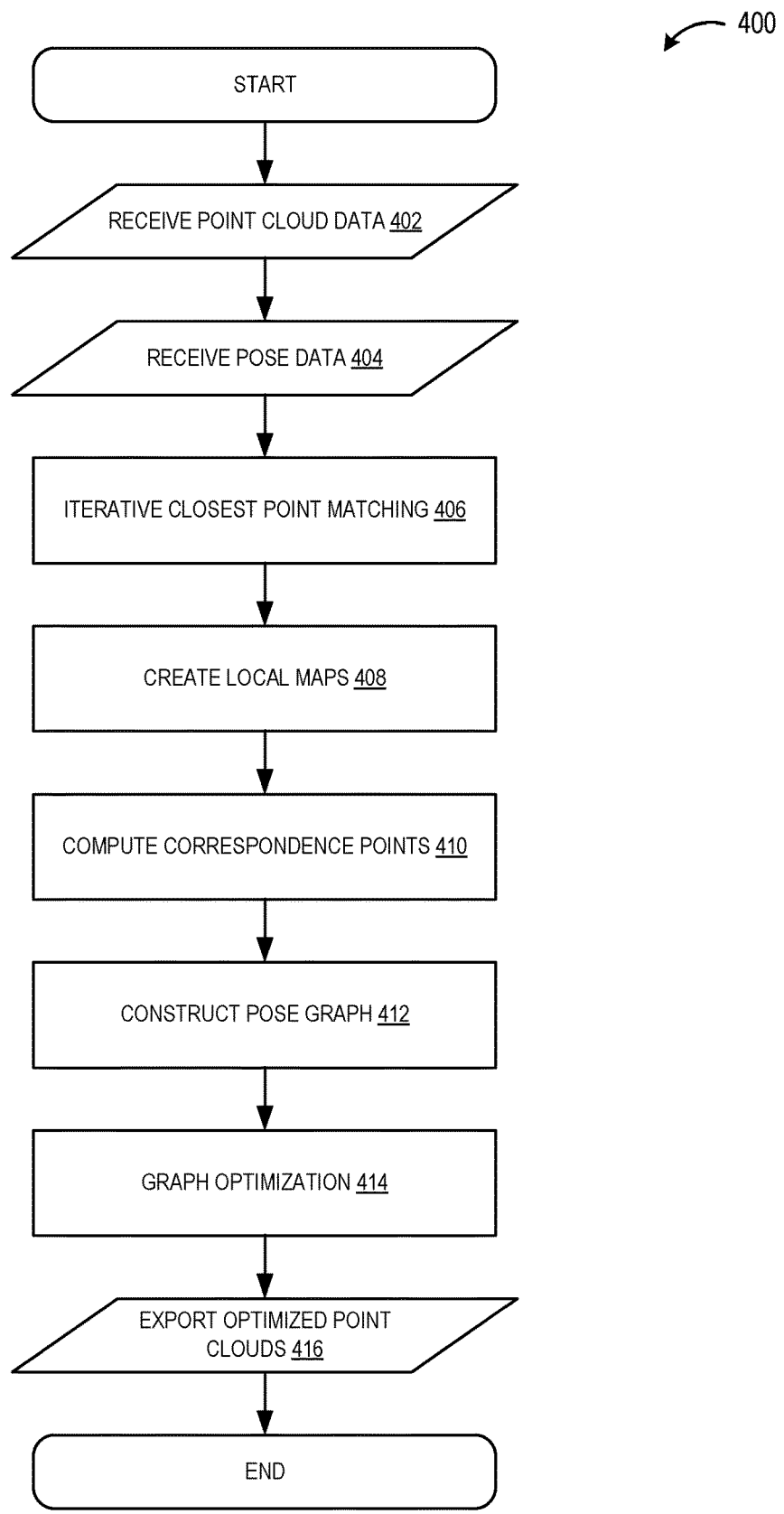
FIG. 4 illustrates an example of performing post-processing of mapping data, in accordance with various embodiments.

FIG. 4 illustrates an example 400 of performing post-processing of mapping data (e.g., point cloud data), in accordance with various embodiments. As discussed, geo-referenced point cloud data 402 and pose data 404 can be obtained by a post-processing application from the payload 124 of a movable object (e.g., a UAV) via the removable media of the payload. For example, as discussed, the removable media (e.g., an SD card) may be removed from the payload and read by a computing device running the post-processing application.

Iterative closest point (ICP) matching is then performed at 406 using the point cloud data 402 and pose data 404. For example, as discussed above, an ICP matching manager may receive data and perform ICP matching. The pose data 404 and the point cloud data 402 are used to construct a data structure called a scan. As discussed, the ICP matching manager can implement an ICP algorithm, such as those available from various libraries such as the point cloud library (PCL), to perform ICP matching of the data. As discussed, the ICP matching module creates local maps by matching similar scans at 408.

Figure 5:
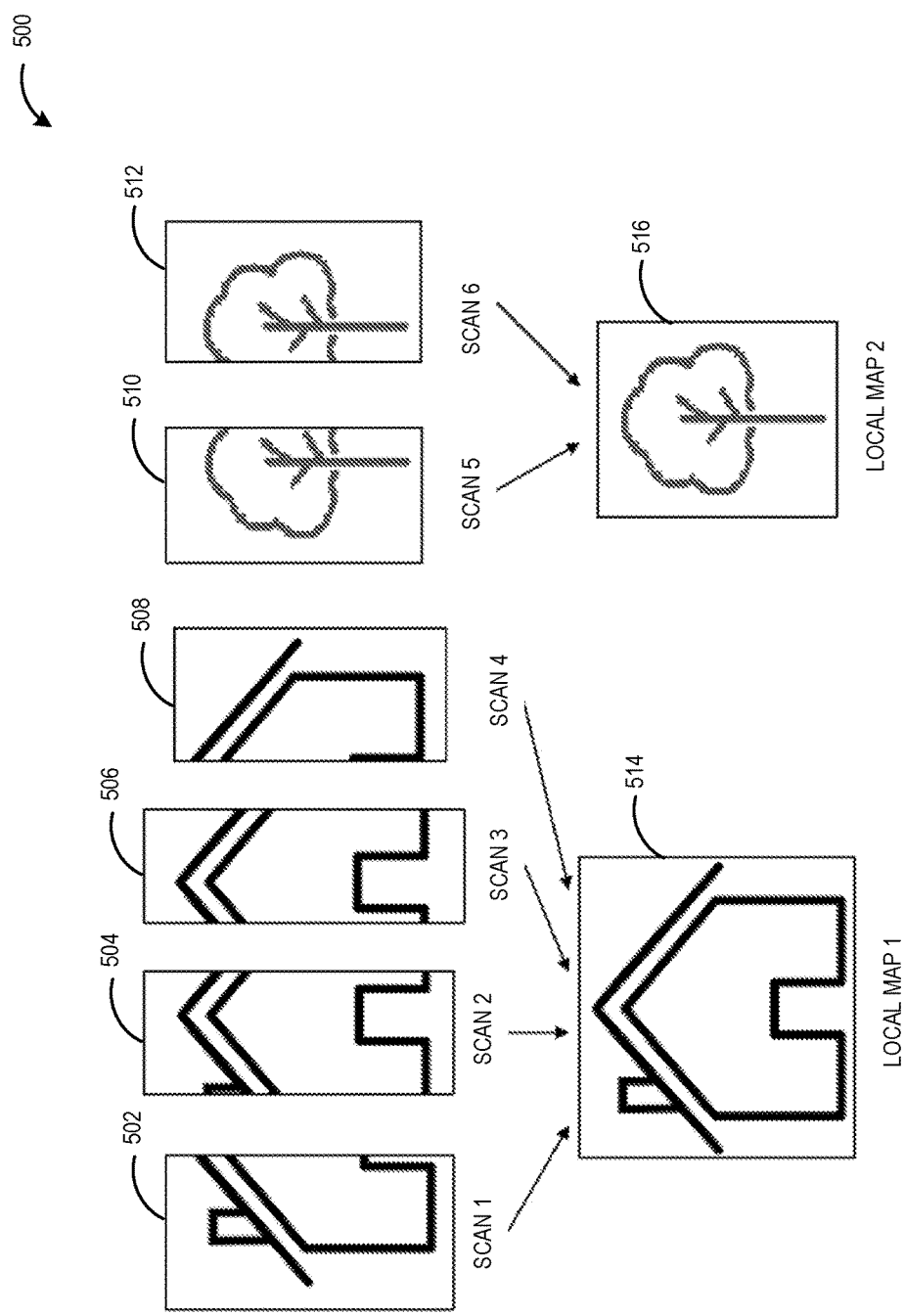
FIG. 5 illustrates an example of creating local maps from scans, in accordance with various embodiments.

For example, FIG. 5 illustrates an example 500 of creating local maps from scans, in accordance with various embodiments. As shown in FIG. 5, the geo-referenced point cloud data may include a plurality of overlapping scans 502-512 of a target region. As discussed, these scans may be generated using the pose data and the point cloud data. For example, the ICP matching manager can implement an ICP algorithm, such as point-to-plane ICP, which is used to minimize the difference between two point clouds and generate the scans 502-512. Conventional systems first extract features from the point cloud data and then perform ICP on the extracted features. In various embodiments, rather than first extracting features from the scans and using these features to match the scans and build the local maps, the ICP module can operate directly on the point cloud data, improving accuracy. Prior techniques performed feature extraction to improve the processing speed of the ICP algorithm. For example, extracting a small amount of data from a large amount of data as feature data can speed up the algorithm. However, feature extraction also results in the exclusion of potentially useful data, which reduces the accuracy of such feature-based techniques. Embodiments perform ICP directly on the point cloud data which improves the accuracy of the results, both by avoiding errors introduced through feature extraction and by avoiding a potential loss of useful data due to feature extraction. Additionally, embodiments dynamically determine the downsampling parameters of the point cloud according to the density/sparseness of the point cloud, and select a suitable downsampled point cloud for ICP processing. In some embodiments, the downsampling parameters are automatically calculated based on the effective density of the point cloud and a scale factor. Alternatively, in some embodiments, the downsampling parameters are specified by the user or via a user configuration. For example, the user may specify a preferred density of point cloud data, and the point cloud data may be downsampled to the preferred density or within a range of the preferred density.

As shown in FIG. 5, multiple scans may be obtained that include representations of at least portions of the same object or objects. In this example, six scans 502-512 may include overlapping features of a house and a tree. The ICP matching module can identify the scans as being related and combine them into local map 1 514 and local map 2 516 showing the house and tree, respectively. As such, the six scans can be reduced to two maps, resulting in more efficient processing. In some embodiments, to achieve successful matching the average density of a scan needs to be higher than 1000 points per cubic meter with an overlapping rate of greater than 70%. Additionally, in some embodiments, for two poses to be matched, the error of the pose from noise needs to be less than 10 cm.

Returning to FIG. 4, the local maps can then be used to compute correspondence points at 410. For example, as discussed above, a correspondence points manager can process the local maps to identify correspondence points between the local maps. For example, in addition to overlapping coverage between scans, there may also be overlapping coverage between the local maps. The correspondence points between the local maps correspond to the same point in space that has been scanned multiple times from different poses. In some embodiments, ICP matching techniques may also be used to identify the correspondence points between the local maps. As discussed above with respect to construction of the local maps, the ICP algorithm can operate directly on the point cloud data, without first requiring feature extraction to be performed. Once the correspondence points have been identified between the local maps, then a pose graph can be constructed from the local maps at 412.

Figure 6:
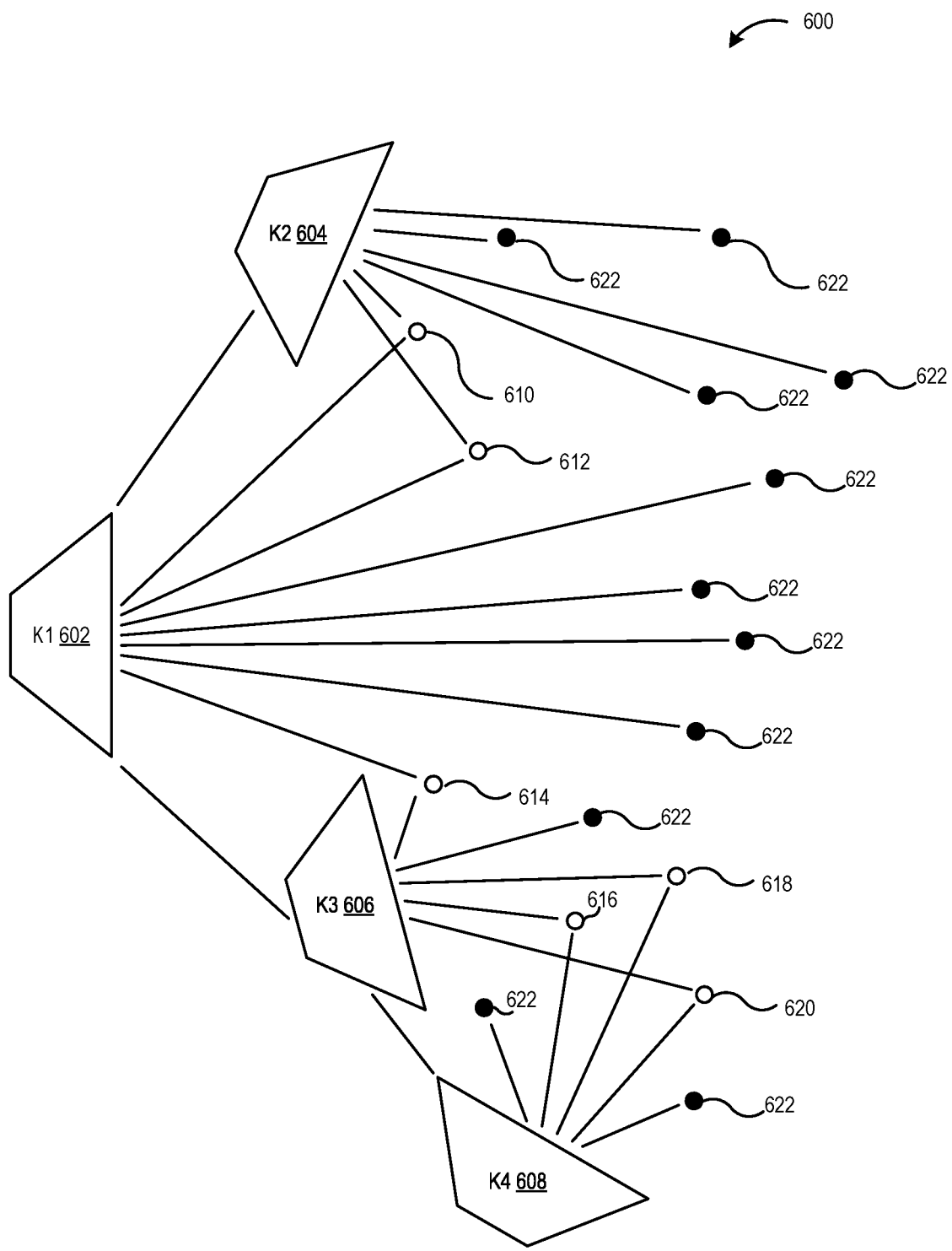
FIG. 6 illustrates an example of constructing a pose graph, in accordance with various embodiments.

For example, FIG. 6 illustrates an example 600 of constructing a pose graph, in accordance with various embodiments. As shown in FIG. 6, four poses K1-K4 602-608, each capturing a different portion of the target environment. Each pose is associated with point cloud data that was captured by the payload in that pose, which includes a plurality of points. These include points that were captured only in that pose, shown as black circles such as circles 622, and points that appear in multiple poses, shown as white circles such as circles 610-620. ICP matching is used to identify these correspondence points 610-620, as discussed above.

Returning to FIG. 4, once the pose graph has been constructed, it can be optimized by performing graph optimization at 414. For example, a graph optimization manager can optimize the pose graph. In some embodiments, a cost function (also referred to herein as an error function) can be minimized for every pair of correspondence points. Because each pair of correspondence points represents the same real point in space, a distance between the two correspondence points should be zero. However, due to errors inherent in the scanning sensor and/or positioning sensor, weather-related errors, or other noise, the distance between correspondence points may be greater than zero. This distance is the error value that can be minimized in the cost function. In some embodiments, the cost functions can be globally solved for a plurality of transforms, each transform used to transform a correspondence point in one pose from the local coordinate system of that pose to a global coordinate system. An example cost function is shown below:

$$e = \text{dist}(p_1, T_1 \cdot T_2^{-1} \cdot p_2),$$

where $p_1$ is the point from a first local map of a first pose, $p_2$ is the correspondence point from a second local map of a second pose, $T_1$ is the transform between the global frame and the first local map, and $T_2$ is the transform between the global frame and the second local map. Similar cost functions can be created for each pair of correspondence points (e.g., a single point in space scanned twice from different poses). The optimized pose graph can be calculated by globally solving all of these cost functions for the correspondence points to determine a set of transforms that minimizes the error distances. For example, in FIG. 6, correspondence points 610 and 612 both appear in poses K1 602 and K2 604. As such, there is a point associated with correspondence point 610 in both poses and a point associated with correspondence point 612 in both poses. A cost function, as discussed above, is generated for both of these correspondence points, using their respective points in both poses. Similar cost functions may be generated for the other correspondence points 614-620. These cost functions may be globally solved to obtain the transforms that can be used to optimize the pose graph.

Returning to FIG. 4, Once the transforms have been calculated, they represent a set of transforms that transforms each local map to the global frame such that the distances between correspondence points are minimized By applying the transforms to the local maps, the optimized point cloud data is obtained. This optimized point cloud data can then be exported at 416, for example to a mapping application or other user interface (UI) application which visualizes the optimized point cloud data for the user to view.

Figure 7:
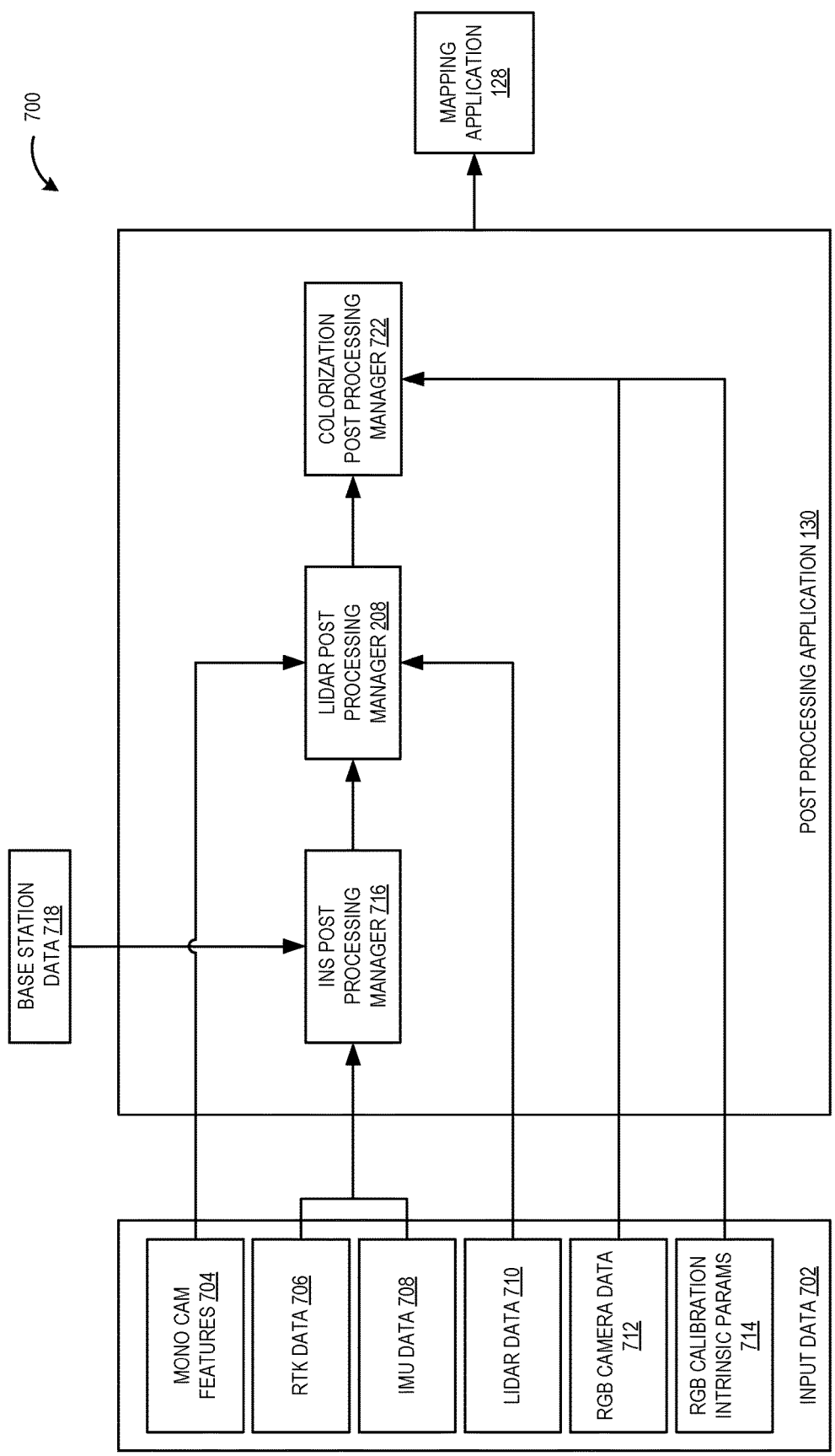
FIG. 7 illustrates an example of a system for performing post-processing of mapping data, in accordance with various embodiments.

FIG. 7 illustrates an example 700 of a system for performing post-processing of mapping data, in accordance with various embodiments. As shown in FIG. 7, post processing application 130 can receive input data 702 from a variety of data sources. For example, payload 124, discussed above, may include a plurality of sensors, such as a monocular camera, GPS sensors, real-time kinematic (RTK) sensors, motion sensors, inertial sensors (e.g., an inertial measurement unit (IMU)), proximity sensors, LiDAR sensors, or image sensors (e.g., an RGB camera or other camera). The sensors of the payload can collect the input data during a mission and store the input data locally on the movable object. As discussed, in some embodiments, all or a portion of this data may be stored to a removable medium (e.g., an SD card) which, at the end of a mission, can be removed and read by a computing device that includes post processing application 130. Additionally, or alternatively, this data may be transferred from the movable object to a computing device for processing wirelessly through one or more networks, a point to point connection, or other connection and may be communicated via one or more various communication protocols as may be appropriate depending on implementation.

In some embodiments, real-time kinematic (RTK) data 706 and IMU data 708 may be read by an inertial navigation system (INS) post processing manager 716. The INS post processing manager 716 can combine the RTK and IMU data to obtain more precise location data associated with the payload during the mission. In some embodiments, this may be augmented using base station data 718, which may include radio technical commission for maritime services (RTCM) correction data obtained from one or more base stations. In some embodiments, the post processed INS data may be obtained by LiDAR post processing manager 208 and used for LiDAR post processing. In some embodiments, the post processed INS data may be used for georeferencing the LiDAR data 710 obtained from a LiDAR sensor of the payload.

As discussed above, LiDAR post processing manager 208 can receive the pose data and georeferenced point cloud data (e.g., the LiDAR data 710 that has been georeferenced) and generate global optimized point cloud data. In some embodiments, feature data 704 extracted from image data captured by a monocular camera can also be received by LiDAR post processing manager 208 and used for post processing. In some embodiments, the optimized global point cloud data generated by LiDAR post processing manager 208 can be colorized by colorization post processing manager 722. The colorization post processing manager 722 can overlay RGB camera data 712 over the optimized global point cloud data, resulting in a more realistic visualization of the optimized global point cloud data. For example, intrinsic camera parameters 714 associated with the RGB camera of the payload can be used to map the pixel coordinates of the image data to coordinates in the camera reference frame. Once mapped to the camera reference frame, the coordinates can be transformed to the world coordinate system. The color data from pixels having the same coordinates as the points in the optimized global point cloud data can be used to color those points. The colorized optimized global point cloud data can then be output to a mapping application 128 or other visualization application to be rendered for the user to view and/or interact with.

Figure 8:
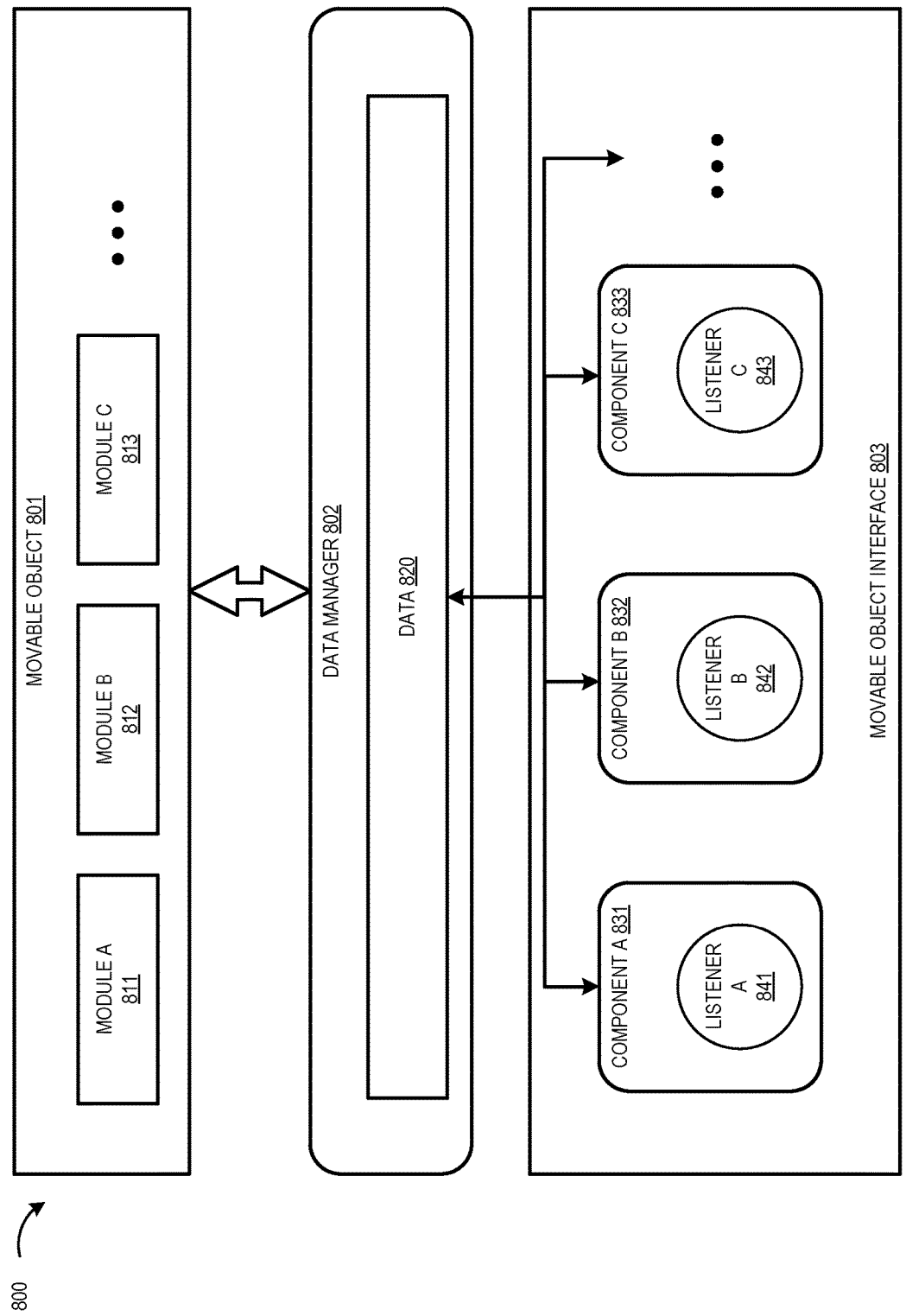
FIG. 8 illustrates an example of a movable object interface in a software development environment, in accordance with various embodiments.

FIG. 8 illustrates an example of supporting a movable object interface in a software development environment, in accordance with various embodiments. As shown in FIG. 8, a movable object interface 803 can be used for providing access to a movable object 801 in a software development environment 800, such as a software development kit (SDK) environment. As used herein, the SDK can be an onboard SDK implemented on an onboard environment that is coupled to the movable object 801. The SDK can also be a mobile SDK implemented on an off-board environment that is coupled to a client device or a mobile device.

Furthermore, the movable object 801 can include various functional modules A-C 811-813, and the movable object interface 803 can include different interfacing components A-C 831-833. Each said interfacing component A-C 831-833 in the movable object interface 803 corresponds to a module A-C 811-813 in the movable object 801. In some embodiments, the interfacing components may be rendered on a user interface of a display of a client device or other computing device in communication with the movable object. In such an example, the interfacing components, as rendered, may include selectable command buttons for receiving user input/instructions to control corresponding functional modules of the movable object.

In accordance with various embodiments, the movable object interface 803 can provide one or more callback functions for supporting a distributed computing model between the application and movable object 801.

The callback functions can be used by an application for confirming whether the movable object 801 has received the commands. Also, the callback functions can be used by an application for receiving the execution results. Thus, the application and the movable object 801 can interact even though they are separated in space and in logic.

As shown in FIG. 8, the interfacing components A-C 831-833 can be associated with the listeners A-C 841-843. A listener A-C 841-843 can inform an interfacing component A-C 831-833 to use a corresponding callback function to receive information from the related module(s).

Additionally, a data manager 802, which prepares data 820 for the movable object interface 803, can decouple and package the related functionalities of the movable object 801. The data manager 802 may be onboard, that is coupled to or located on the movable object 801, which prepares the data 820 to be communicated to the movable object interface 803 via communication between the movable object 801 and a client device or a mobile device. The data manager 802 may be off board, that is coupled to or located on a client device or a mobile device, which prepares data 820 for the movable object interface 803 via communication within the client device or the mobile device. Also, the data manager 802 can be used for managing the data exchange between the applications and the movable object 801. Thus, the application developer does not need to be involved in the complex data exchanging process.

For example, the onboard or mobile SDK can provide a series of callback functions for communicating instant messages and for receiving the execution results from a movable object. The onboard or mobile SDK can configure the life cycle for the callback functions in order to make sure that the information interchange is stable and completed. For example, the onboard or mobile SDK can establish connection between a movable object and an application on a smart phone (e.g. using an Android system or an iOS system). Following the life cycle of a smart phone system, the callback functions, such as the ones receiving information from the movable object, can take advantage of the patterns in the smart phone system and update the statements accordingly to the different stages in the life cycle of the smart phone system.

Figure 9:
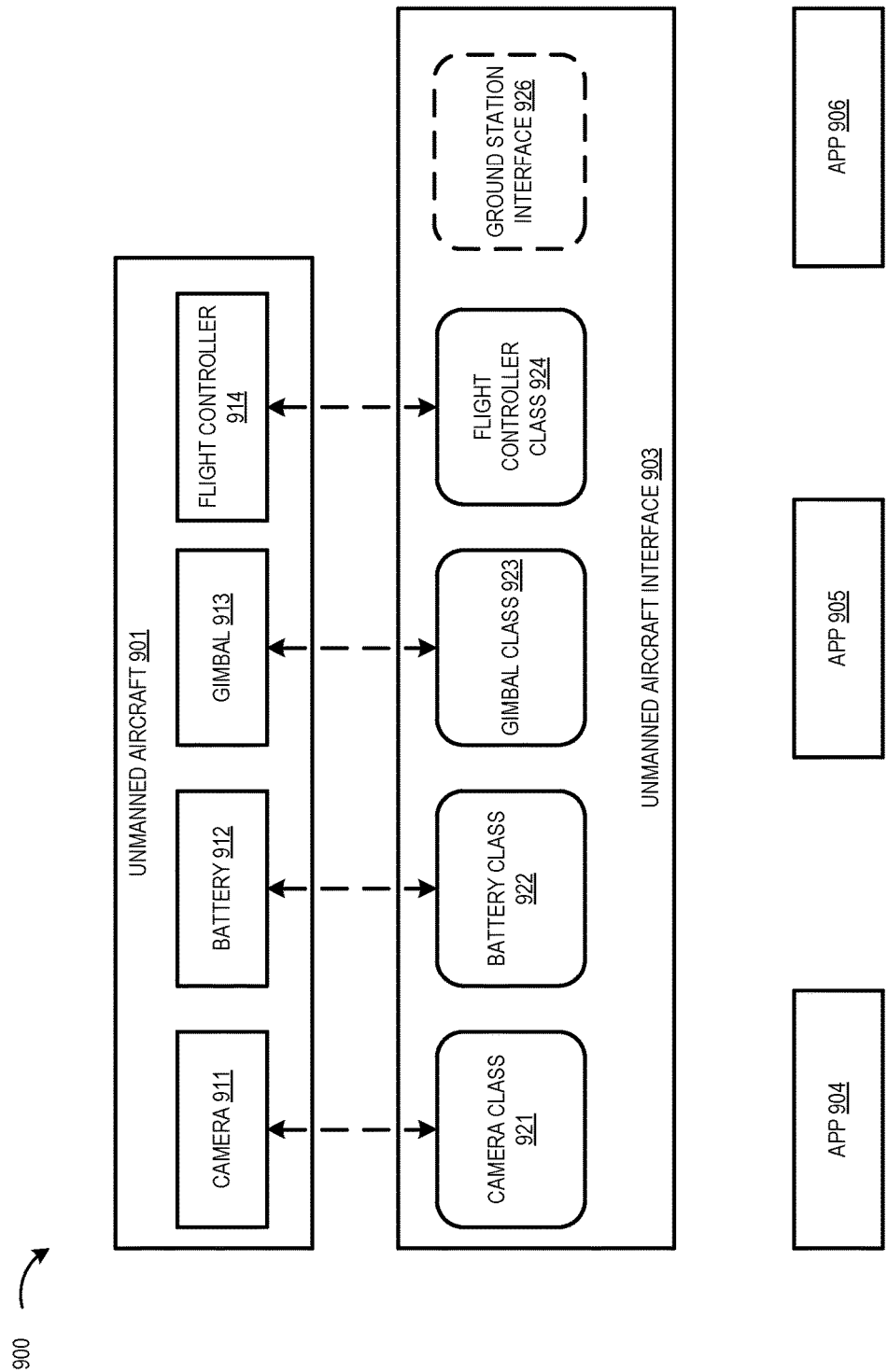
FIG. 9 illustrates an example of a movable object interface, in accordance with various embodiments.

FIG. 9 illustrates an example of a movable object interface, in accordance with various embodiments. As shown in FIG. 9, a movable object interface 903 can be rendered on a display of a client device or other computing devices representing statuses of different components of a movable object 901. Thus, the applications, e.g., APPs 904-906, in the movable object environment 900 can access and control the movable object 901 via the movable object interface 903. As discussed, these apps may include a mapping app 904, a post-processing app 905, and a mobile app 906.

For example, the movable object 901 can include various modules, such as a camera 911, a battery 912, a gimbal 913, and a flight controller 914.

Correspondingly, the movable object interface 903 can include a camera component 921, a battery component 922, a gimbal component 923, and a flight controller component 924 to be rendered on a computing device or other computing devices to receive user input/instructions by way of using the APPs 904-906.

Additionally, the movable object interface 903 can include a ground station component 926, which is associated with the flight controller component 924. The ground station component operates to perform one or more flight control operations, which may require a high-level privilege.

Figure 10:
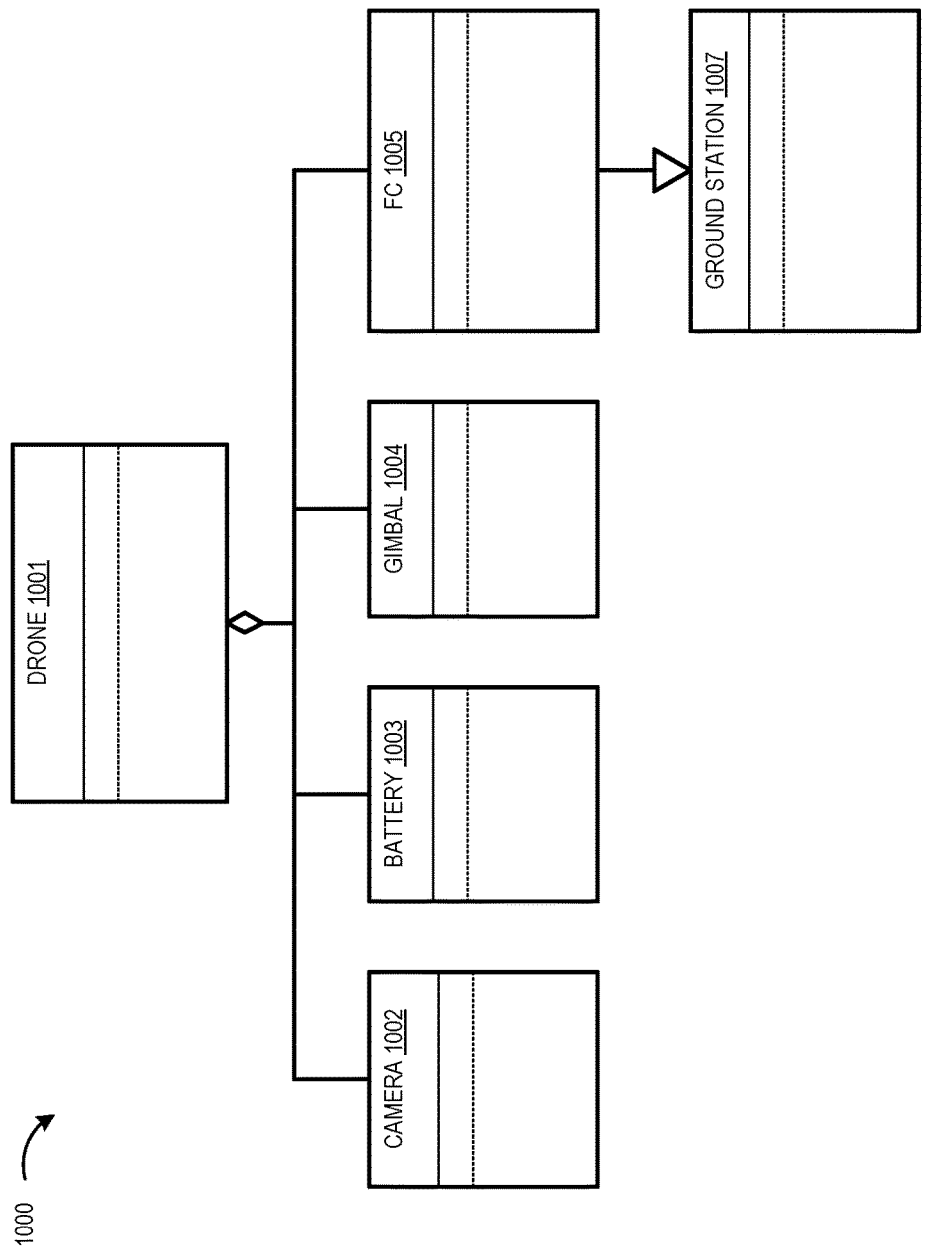
FIG. 10 illustrates an example of components for a movable object in a software development kit (SDK), in accordance with various embodiments.

FIG. 10 illustrates an example of components for a movable object in a software development kit (SDK), in accordance with various embodiments. As shown in FIG. 10, the drone class 1001 in the SDK 1000 is an aggregation of other components 1002-1007 for a movable object (e.g., a drone). The drone class 1001, which have access to the other components 1002-1007, can exchange information with the other components 1002-1007 and controls the other components 1002-1007.

In accordance with various embodiments, an application may be accessible to only one instance of the drone class 1001. Alternatively, multiple instances of the drone class 1001 can present in an application.

In the SDK, an application can connect to the instance of the drone class 1001 in order to upload the controlling commands to the movable object. For example, the SDK may include a function for establishing the connection to the movable object. Also, the SDK can disconnect the connection to the movable object using an end connection function. After connecting to the movable object, the developer can have access to the other classes (e.g. the camera class 1002, the battery class 1003, the gimbal class 1004, and the flight controller class 1005). Then, the drone class 1001 can be used for invoking the specific functions, e.g. providing access data which can be used by the flight controller to control the behavior, and/or limit the movement, of the movable object.

In accordance with various embodiments, an application can use a battery class 1003 for controlling the power source of a movable object. Also, the application can use the battery class 1003 for planning and testing the schedule for various flight tasks. As battery is one of the most restricted elements in a movable object, the application may seriously consider the status of battery not only for the safety of the movable object but also for making sure that the movable object can finish the designated tasks. For example, the battery class 1003 can be configured such that if the battery level is low, the movable object can terminate the tasks and go home outright. For example, if the movable object is determined to have a battery level that is below a threshold level, the battery class may cause the movable object to enter a power savings mode. In power savings mode, the battery class may shut off, or reduce, power available to various components that are not integral to safely returning the movable object to its home. For example, cameras that are not used for navigation and other accessories may lose power, to increase the amount of power available to the flight controller, motors, navigation system, and any other systems needed to return the movable object home, make a safe landing, etc.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1002 for defining various operations on the camera in a movable object, such as an unmanned aircraft. For example, in SDK, the Camera Class includes functions for receiving media data and storing data in SD card, getting & setting photo parameters, taking photo and recording videos.

An application can use the camera class 1002 for modifying the setting of photos and records. For example, the SDK may include a function that enables the developer to adjust the size of photos taken. Also, an application can use a media class for maintaining the photos and records.

In accordance with various embodiments, an application can use a gimbal class 1004 for controlling the view of the movable object or a payload. For example, the Gimbal Class can be used for configuring an actual view, e.g. setting a first personal view of the movable object or the payload. Also, the Gimbal Class can be used for automatically stabilizing the gimbal, in order to be focused on one direction. Also, the application can use the Gimbal Class to change the angle of view of the payload or the payload for detecting different objects.

In accordance with various embodiments, an application can use a flight controller class 1005 for providing various flight control information and status about the movable object. As discussed, the flight controller class can include functions for receiving and/or requesting access data to be used to control the movement of the movable object across various regions in a movable object environment.

Using the Flight Controller Class, an application can monitor the flight status, e.g. using instant messages. For example, the callback function in the Flight Controller Class can send back the instant message every one thousand milliseconds (1000 ms).

Furthermore, the Flight Controller Class allows a user of the application to investigate the instant message received from the movable object. For example, the pilots can analyze the data for each flight in order to further improve their flying skills.

In accordance with various embodiments, an application can use a ground station class 1007 to perform a series of operations for controlling the movable object.

For example, the SDK may require applications to have an SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the movable object.

Figure 11:
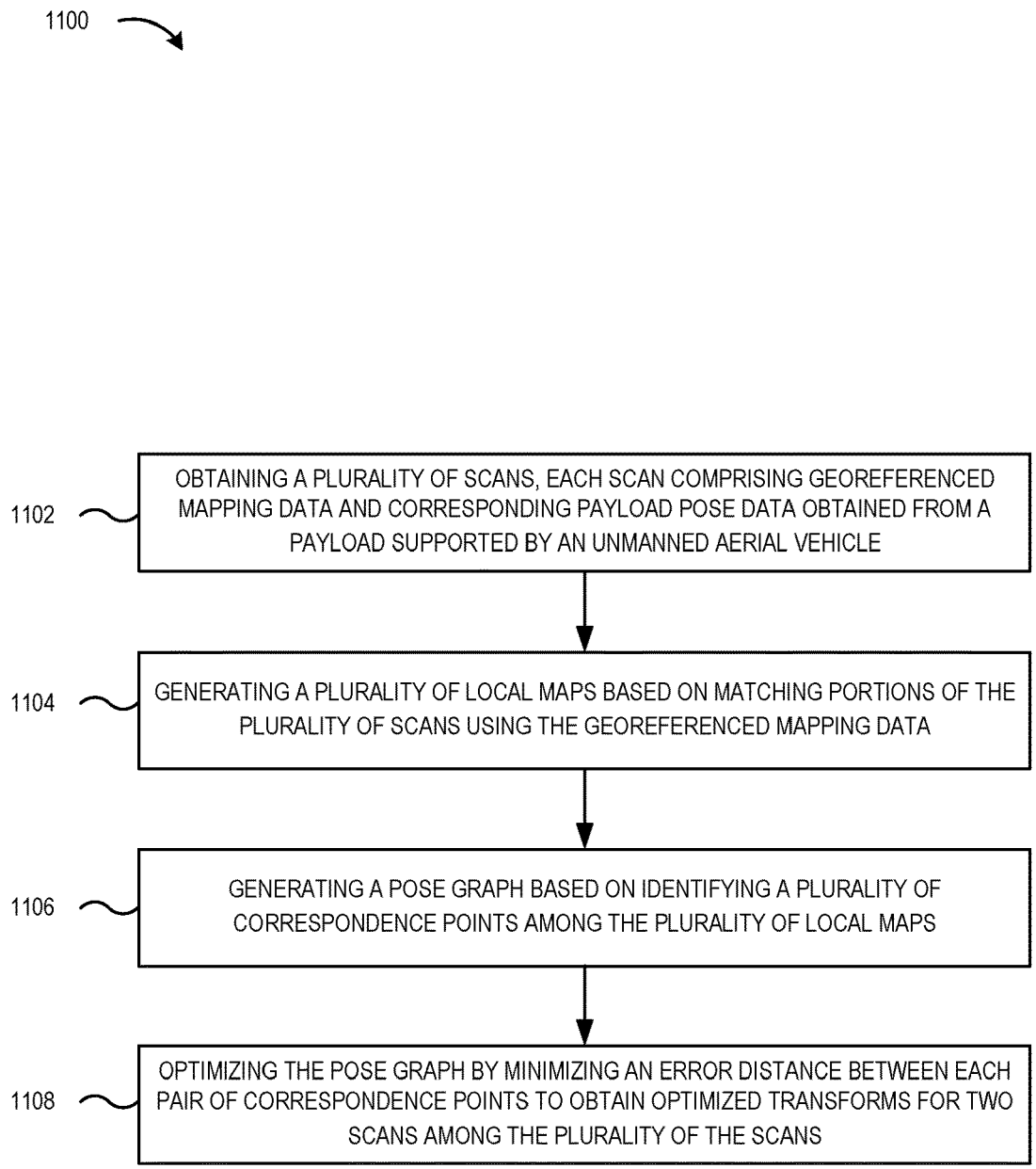
FIG. 11 shows a flowchart of a method of post-processing mapping data in a movable object environment, in accordance with various embodiments.

FIG. 11 shows a flowchart of a method of post-processing mapping data in a movable object environment, in accordance with various embodiments. At operation/step 1102, the method includes obtaining a plurality of scans, each scan comprising georeferenced mapping data and corresponding payload pose data obtained from a payload supported by an unmanned aerial vehicle. For example, the plurality of scans may be generated from pose data and point cloud data obtained from sensors of a payload of a movable object. In some embodiments, the plurality of scans includes a plurality of overlapping scans of a target region. In some embodiments, the plurality of scans are obtained from a payload coupled to a movable object in different poses. In some embodiments, the payload includes a LiDAR sensor and an inertial measurement unit (IMU).

At operation/step 1104, the method includes generating a plurality of local maps based on matching portions of the plurality of scans using the georeferenced mapping data. In some embodiments, generating the plurality of local maps further includes identifying at least one pair of overlapping scans from the plurality of scans based on point cloud data associated with the at least one pair of overlapping scans, and combining the at least one pair of overlapping scans into a first local map. In some embodiments, identifying at least one pair of overlapping scans further includes determining the at least one pair of overlapping scans are overlapping using iterative closest point (ICP) matching.

At operation/step 1106, the method includes generating a pose graph based on identifying a plurality of correspondence points among the plurality of local maps. In some embodiments, generating the pose graph further includes determining at least one pair of correspondence points in at least two of the local maps using iterative closest point (ICP) matching, the at least one correspondence point representing a same point in space in the at least two of the local maps. In some embodiments, determining at least one pair of correspondence points in at least two of the local maps using iterative closest point (ICP) matching further includes performing ICP matching directly on the georeferenced mapping data.

At operation/step 1108, the method includes optimizing the pose graph by minimizing an error distance between each pair of correspondence points to obtain optimized transforms for two scans among the plurality of the scans. In some embodiments, optimizing the pose graph further includes determining one or more cost functions, each cost function corresponding to a pair of correspondence points from the plurality of correspondence points, and globally solving the one or more cost functions to obtain the optimized transforms. In some embodiments, the optimized transforms minimize the error distance between each pair of correspondence points.

In some embodiments, the method further includes generating optimized point cloud data using the optimized transforms and the plurality of scans. In some embodiments, the method further includes obtaining color data from an RGB camera, and overlaying the color data on the optimized point cloud data.

Many features can be performed in, using, or with the assistance of hardware, software, firmware, or combinations thereof. Consequently, features may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features can be incorporated in software and/or firmware for controlling the hardware of a processing system, and for enabling a processing system to interact with other mechanism utilizing the results. Such software or firmware may include, but is not limited to, application code, device drivers, operating systems, and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description has been provided for the purposes of illustration and description. It is not intended to be exhaustive or to limit the invention to the precise forms disclosed. The breadth and scope should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A method, comprising:
    obtaining a plurality of scans, each scan comprising georeferenced mapping data and corresponding payload pose data obtained from a payload supported by a movable object;
    generating a plurality of local maps based on matching portions of the plurality of scans using the georeferenced mapping data;
    generating a pose graph from the plurality of local maps, including identifying a plurality of pairs of correspondence points each including two correspondence points from two of the plurality of local maps, respectively, and representing a same point in space; and
    optimizing the pose graph by minimizing a distance between the two correspondence points in each of the plurality of pairs of correspondence points to obtain optimized transforms each for two of the plurality of the scans.

2. The method of claim 1, wherein the plurality of scans includes a plurality of overlapping scans of a target region or a target object.

3. The method of claim 2, wherein generating the plurality of local maps based on matching portions of the plurality of scans using the georeferenced mapping data, further comprises:
    identifying at least one pair of overlapping scans from the plurality of scans based on point cloud data associated with the at least one pair of overlapping scans; and
    combining the at least one pair of overlapping scans into a local map.

4. The method of claim 3, wherein identifying the at least one pair of overlapping scans from the plurality of scans based on the point cloud data associated with the at least one pair of overlapping scans, further comprises:
    determining the at least one pair of overlapping scans are overlapping using iterative closest point (ICP) matching.

5. The method of claim 1, wherein identifying the plurality of pairs of correspondence points, further comprises:
    determining the plurality of pairs of correspondence points using iterative closest point (ICP) matching.

6. The method of claim 5, wherein determining the plurality of pairs of correspondence points using iterative closest point (ICP) matching, further comprises:
    performing ICP matching directly on the georeferenced mapping data.

7. The method of claim 1, wherein optimizing the pose graph by minimizing the distance between the two correspondence points in each of the plurality of pairs of correspondence points to obtain the optimized transforms, further comprises:
    determining one or more cost functions, each cost function corresponding to a pair of correspondence points from the plurality of correspondence points; and
    globally solving the one or more cost functions to obtain the optimized transforms.

8. The method of claim 1, further comprising:
    generating optimized point cloud data using the optimized transforms and the plurality of scans.

9. The method of claim 8, further comprising:
    obtaining color data from an RGB camera; and
    overlaying the color data on the optimized point cloud data.

10. The method of claim 1, wherein the payload includes a LiDAR sensor and an inertial measurement unit.

11. A system, comprising:
    a movable object;
    a payload coupled to the movable object;
    a computing device including at least one processor and a memory, the memory including instructions which, when executed by the at least one processor, cause the computing device to:
        obtain a plurality of scans from the payload, each scan comprising georeferenced mapping data and corresponding payload pose data obtained from the payload;

generate a plurality of local maps based on matching portions of the plurality of scans using the georeferenced mapping data;

generate a pose graph from the plurality of local maps, including identifying a plurality of pairs of correspondence points each including two correspondence points from two of the plurality of local maps, respectively, and representing a same point in space; and optimize the pose graph by minimizing a distance between the two correspondence points in each of the plurality of pairs of correspondence points to obtain optimized transforms each for two of the plurality of the scans.

12. The system of claim 11, wherein the plurality of scans includes a plurality of overlapping scans of a target region or a target object.

13. The system of claim 12, wherein to generate the plurality of local maps based on matching portions of the plurality of scans using the georeferenced mapping data, the instructions, when executed, further cause the computing device to:

identify at least one pair of overlapping scans from the plurality of scans based on point cloud data associated with the at least one pair of overlapping scans; and combine the at least one pair of overlapping scans into a local map.

14. The system of claim 13, wherein to identify the at least one pair of overlapping scans from the plurality of scans based on the point cloud data associated with the at least one pair of overlapping scans, the instructions, when executed, further cause the computing device to:

determine the at least one pair of overlapping scans are overlapping using iterative closest point (ICP) matching.

15. The system of claim 13, wherein to optimize the pose graph by minimizing the distance between the two correspondence points in each of the plurality of pairs of correspondence points to obtain the optimized transforms, the instructions, when executed, further cause the computing device to:

determine a plurality of one or more cost functions, each cost function corresponding to a pair of correspondence points from the plurality of correspondence points; and globally solve the plurality of one or more cost functions to obtain the optimized transforms.

16. The system of claim 13, wherein the instructions, when executed, further cause the computing device to:

generate optimized point cloud data using the optimized transforms and the plurality of scans.

17. The system of claim 11, wherein to identify the plurality of pairs of correspondence points, the instructions, when executed, further cause the computing device to:

determine the plurality of pairs of correspondence points using iterative closest point (ICP) matching.

18. The system of claim 17, wherein to determine the plurality of pairs of correspondence points using iterative closest point (ICP) matching, the instructions, when executed, further cause the computing device to:

perform ICP matching directly on the georeferenced mapping data.

19. A non-transitory computer readable storage medium including instructions stored thereon which, when executed by a processor, cause the processor to:

obtain a plurality of scans, each scan comprising georeferenced mapping data and corresponding payload pose data obtained from a payload supported by a movable object;

generate a plurality of local maps based on matching portions of the plurality of scans using the georeferenced mapping data;

generate a pose graph from the plurality of local maps, including identifying a plurality of pairs of correspondence points each including two correspondence points from two of the plurality of local maps, respectively, and representing a same point in space; and optimize the pose graph by minimizing a distance between the two correspondence points in each of the plurality of pairs of correspondence points to obtain optimized transforms each for two of the plurality of the scans.

20. The non-transitory computer readable storage medium of claim 19, wherein the plurality of scans includes a plurality of overlapping scans of a target region.

* * * * *